United States Patent
Okanemasa et al.

(10) Patent No.: US 12,270,504 B2
(45) Date of Patent: Apr. 8, 2025

(54) ADJUSTMENT DEVICE

(71) Applicant: KYOCERA Corporation, Kyoto (JP)

(72) Inventors: Tempei Okanemasa, Tokyo (JP); Atsushi Yoshikawa, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/261,866

(22) PCT Filed: Jan. 21, 2022

(86) PCT No.: PCT/JP2022/002294
§ 371 (c)(1),
(2) Date: Jul. 18, 2023

(87) PCT Pub. No.: WO2022/163545
PCT Pub. Date: Aug. 4, 2022

(65) Prior Publication Data
US 2024/0077169 A1    Mar. 7, 2024

(30) Foreign Application Priority Data

Jan. 27, 2021 (JP) .................. 2021-011293

(51) Int. Cl.
*F16M 11/00* (2006.01)
*F16M 11/12* (2006.01)

(52) U.S. Cl.
CPC ................ *F16M 11/123* (2013.01)

(58) Field of Classification Search
CPC .... F16M 11/123; F16M 11/18; F16M 13/022; G03B 15/00; G03B 17/56
See application file for complete search history.

(56) References Cited

U.S. PATENT DOCUMENTS

| | | | | |
|---|---|---|---|---|
| 4,598,297 A | * | 7/1986 | Hawkins | H01Q 1/125 343/882 |
| 7,046,210 B1 | * | 5/2006 | Brooker | H01Q 3/08 343/882 |
| 7,142,168 B1 | * | 11/2006 | Sinclair | H01Q 19/10 343/890 |
| 11,038,253 B1 | * | 6/2021 | Tseng | H01Q 1/288 |

FOREIGN PATENT DOCUMENTS

| | | |
|---|---|---|
| JP | 2003-018435 A | 1/2003 |
| JP | 2008-083634 A | 4/2008 |
| JP | 2019-045690 A | 3/2019 |

* cited by examiner

Primary Examiner — Amy J. Sterling
(74) Attorney, Agent, or Firm — Studebaker Brackett PLLC (57) ABSTRACT

Provided is an adjustment device that reduces fluctuations in mounting angle of a detector. An adjustment device (10) includes a first member (11), a second member (12), an adjustment member (16), and an elastic member (22). The first member (11) includes a base (13) on which a detector is mountable. The first member (11) is attached to the second member (12) through a first shaft (15) such that the first member is rotatable in a first direction and a second direction. The adjustment member (16) is configured to restrict rotation of the first member (11) in the first direction and define a rotation range of the first member (11). The elastic member (22) urges the first member (11) in the first direction.

10 Claims, 9 Drawing Sheets

ADJUSTMENT DEVICE

CROSS-REFERENCE TO RELATED APPLICATIONS

The present application claims priority to Japanese Patent Application No. 2021-011293, filed on Jan. 27, 2021, which is hereby incorporated by reference herein in its entirety.

TECHNICAL FIELD

The present disclosure relates to an adjustment device.

BACKGROUND OF INVENTION

Safe driving assistance systems have recently been under development. Such a system includes a road observation apparatus installed on the roadside to detect vehicles, pedestrians, and other objects and provide warning against danger to a vehicle approaching the road observation apparatus. The road observation apparatus includes a detector, such as a camera. Upon installation, the orientation of the detector is adjusted to a road surface as an observation target. For example, Patent Literature 1 discloses a fixing device that enables adjustment of a mounting angle of, for example, a surveillance camera.

CITATION LIST

Patent Literature

Patent Literature 1: Japanese Unexamined Patent Application Publication No. 2008-83634

SUMMARY

In an embodiment of the present disclosure, an adjustment device includes a first member, a second member, an adjustment member, and an elastic member. The first member includes a base on which a detector is mountable. The first member is attached to the second member through a first shaft such that the first member is rotatable in a first direction and a second direction. The adjustment member is configured to restrict rotation of the first member in the first direction and define a rotation range of the first member. The elastic member urges the first member in the first direction.

DESCRIPTION OF EMBODIMENTS (Communication System)

Figure 1:
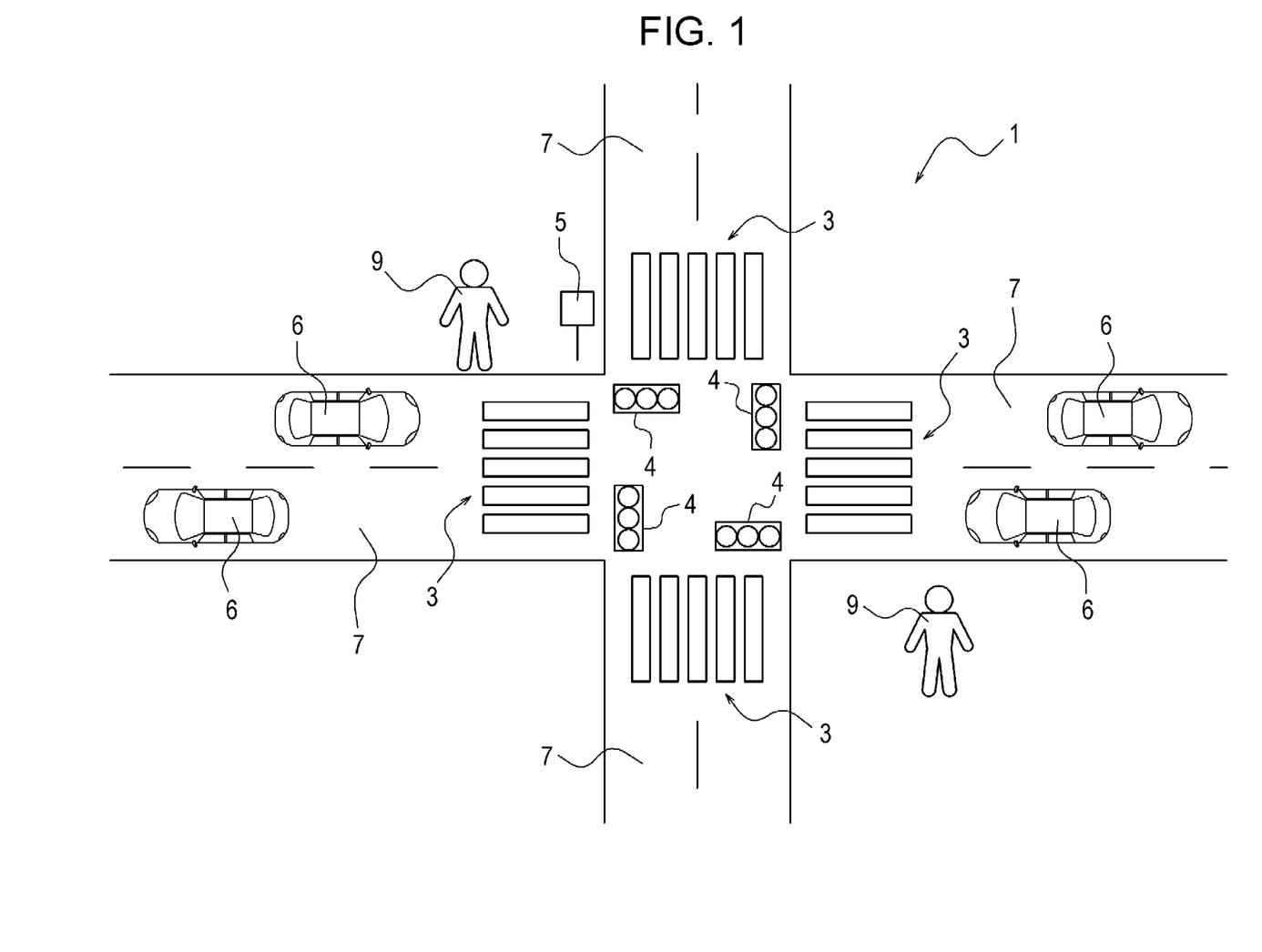
FIG. 1 is a diagram illustrating an exemplary configuration of a communication system including a road observation apparatus.

FIG. 1 illustrates an exemplary configuration of a communication system 1 including a road observation apparatus 5. The communication system 1 is, for example, a safe driving assistance communication system for intelligent transport systems (ITS). The safe driving assistance communication system is called a safe driving assistance system or a safe driving assistance wireless system.

In an embodiment of the present disclosure, an adjustment device 10 is used to adjust a mounting angle of a detector 50 in the road observation apparatus 5. The configuration and installation of the road observation apparatus 5 will be described in brief. The adjustment device 10 according to the embodiment will then be described.

The road observation apparatus 5, which observes vehicles 6, objects, and persons on roads, is a roadside unit or a surveillance camera unit, for example. In the following description, it is assumed that the road observation apparatus 5 is a roadside unit. The road observation apparatus 5 is installed near, for example, an intersection of multiple roads 7 (roadways).

The communication system 1 enables mutual wireless communication between the road observation apparatus 5 and each of the vehicles 6, such as automobiles, running on the roads 7. The vehicles 6 may be capable of performing wireless communication with each other. The communication system 1 may further include electronic devices carried by pedestrians 9 and enable wireless communication. The electronic devices are, for example, portable terminals such as smartphones.

The road observation apparatus 5 can notify each vehicle 6 of safe driving assistance information to assist a driver of the vehicle 6 in driving safely. The safe driving assistance information may include information on lighting of traffic signals 4, information on road restriction, and road linear information indicating, for example, the shape of the intersection (or the shapes of the roads 7) at or near which the road observation apparatus 5 is installed. The road observation apparatus 5 also detects a nearby vehicle 6 and a pedestrian 9. The road observation apparatus 5 can detect, for example, a pedestrian 9 on a crossing 3. The road observation apparatus 5 can detect a vehicle 6 approaching the intersection. The road observation apparatus 5 can notify the vehicle 6 of safe driving assistance information including information on the detected vehicle 6 and the detected pedestrian 9. The road observation apparatus 5 can notify the other vehicles 6 of safe driving assistance information including information provided by the vehicle 6. As described above, the road observation apparatus 5 may be capable of notifying the electronic devices carried by the pedestrians 9 of the above-described pieces of information.

As described above, the communication system 1 assists a driver of each vehicle 6 in driving safely. The vehicle 6 is not limited to an automobile. Examples of the vehicle 6 may include a motorcycle, a bus, a tram, and a bicycle.

(Functional Block Diagram of Road Observation Apparatus)

Figure 2:
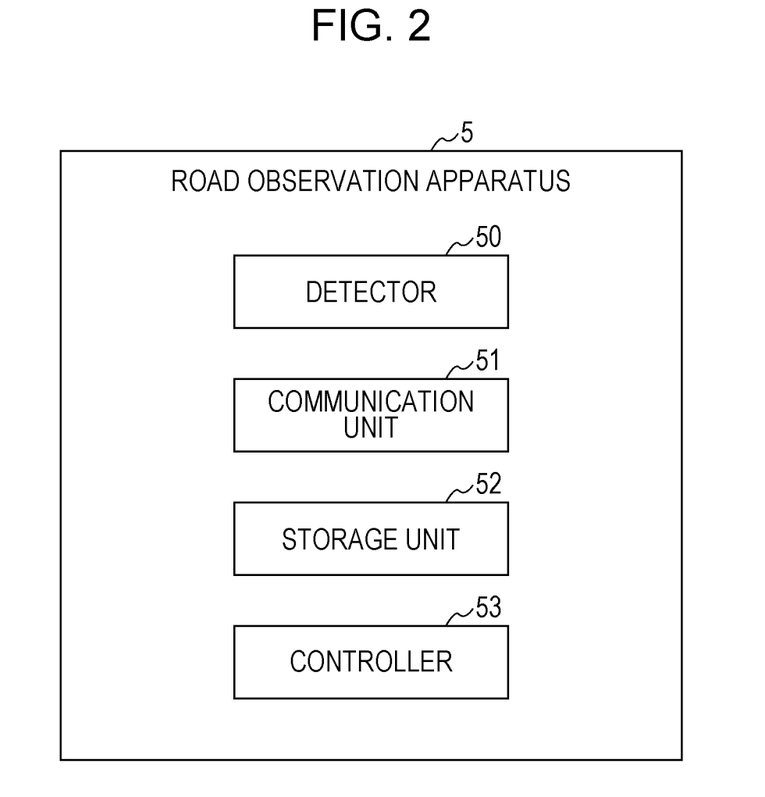
FIG. 2 is an exemplary functional block diagram of the road observation apparatus.

FIG. 2 is a functional block diagram of the road observation apparatus 5. The road observation apparatus 5 includes the detector 50, a communication unit 51, a storage unit 52, and a controller 53. The road observation apparatus 5 may include multiple detectors 50.

The detector 50 is a device to detect the vehicles 6, the pedestrians 9, and other objects. The detector 50 includes a sensor. The detector 50 may be a visible light camera including an image sensor. The detector 50 may be an infrared camera including an infrared sensor. The detector 50 outputs, for example, a detection signal from the sensor, to the controller 53.

The communication unit 51 performs wireless communication with the vehicles 6 under the control of the controller 53. The communication unit 51 may include a communication circuit and an antenna. The antenna may be, for example, a nondirectional antenna. The communication unit 51 may perform wireless communication using, for example, a 700 MHz band allocated to ITS. The communication unit 51 may perform wireless communication using, for example, a wireless local area network (LAN).

The storage unit 52 may function as a memory to store various pieces of information. The storage unit 52 may store, for example, a program that runs on the controller 53 and the result of a process executed by the controller 53. The storage unit 52 may function as a working memory for the controller 53.

The controller 53 controls the other components of the road observation apparatus 5 to manage operation of the road observation apparatus 5 in a centralized manner. The controller 53 may include at least one processor. The processor may load a program from an accessible memory and implement various functions of the road observation apparatus 5.

(Configuration of Road Observation Apparatus)

Figure 3:
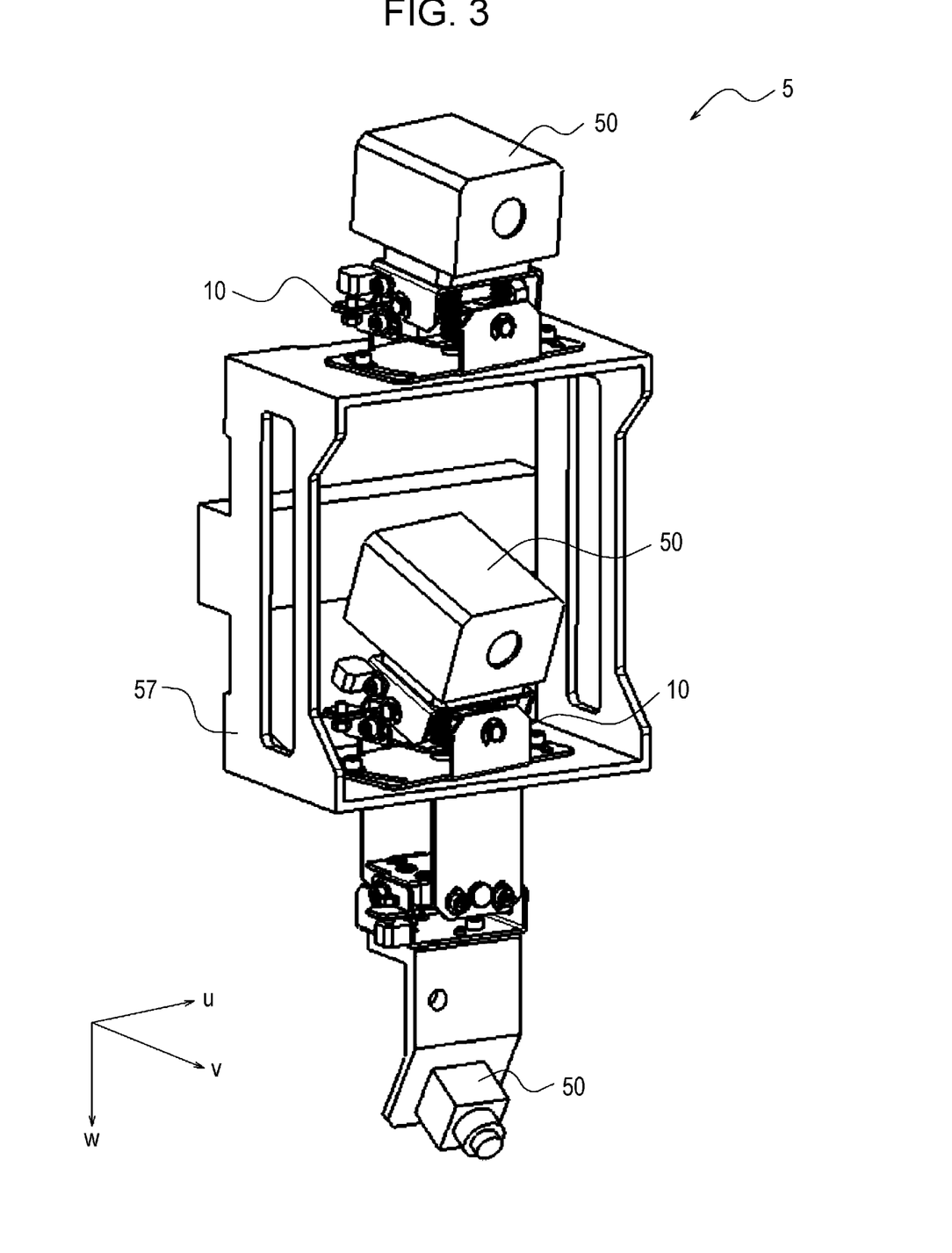
FIG. 3 is a diagram illustrating an exemplary configuration of the road observation apparatus.

FIG. 3 is a diagram illustrating an exemplary configuration of the road observation apparatus 5. As illustrated in FIG. 3, the road observation apparatus 5 may include multiple detectors 50 and be provided as a road observation unit in which a relative positional relationship is defined between the multiple detectors 50 connected to a connector 57.

The connector 57 is a member to connect the detectors 50. The connector 57 is, for example, a frame-shaped metallic member. The material and shape of the connector 57 are not limited. As illustrated in FIG. 3, a Cartesian coordinate system can be defined for the road observation apparatus 5, serving as a road observation unit. For example, a u-axis direction, a v-axis direction, and a w-axis direction correspond to directions in which sides perpendicular to one another at each vertex of the connector 57 extend. As illustrated in FIG. 3, the multiple detectors 50 may be arranged in the w-axis direction. The arrangement is not limited to this example. In another example, the multiple detectors 50 may be arranged in the u-axis direction.

Figure 4:
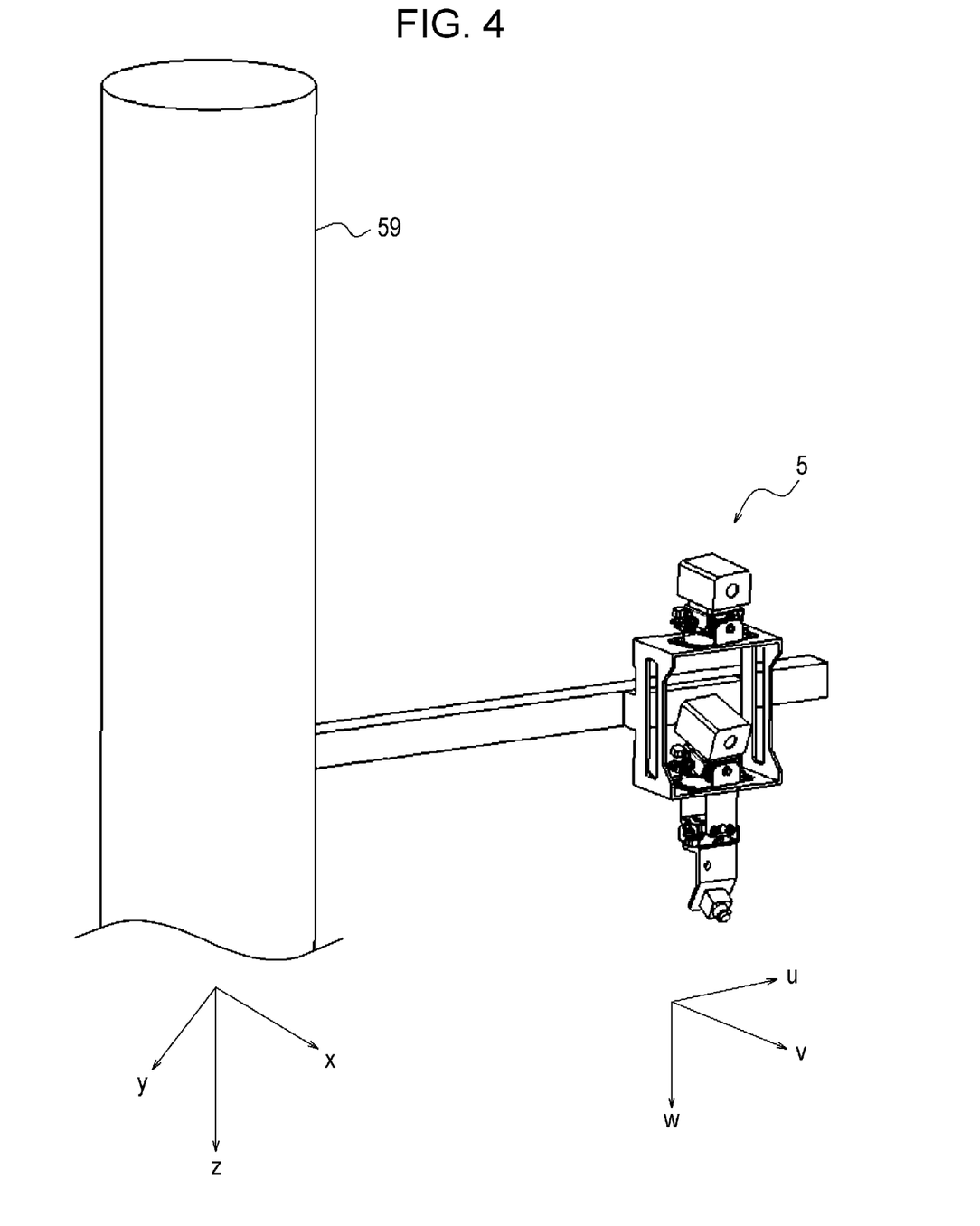
FIG. 4 is a diagram illustrating exemplary installation of the road observation apparatus.

FIG. 4 illustrates exemplary installation of the road observation apparatus 5. The road observation apparatus 5 is installed on, for example, a pole 59 in the vicinity of the intersection of the roads 7, serving as observation targets. The connector 57 may be secured to the pole 59. The orientation of each detector 50 may be adjusted relative to the connector 57. For the road observation apparatus 5 installed to observe a road, the w-axis direction is a vertical direction. In FIG. 4, a direction along the z axis is the vertical direction, and the x axis and the y axis each represent a horizontal direction perpendicular to the z axis.

The road observation apparatus 5 includes the adjustment devices 10 to adjust the orientations of the detectors 50 such that a detection direction of each of the detectors 50 is in a desired direction. The detection direction is a direction from the detector 50 to a space corresponding to the center of a detection range, or a direction to the center of the angle of view. When the connector 57 is secured to the pole 59, each adjustment device 10 adjusts the angle of the detector 50 so that the detector 50 observes a road at an appropriate angle of depression.

(Configuration of Adjustment Device)

Figure 5:
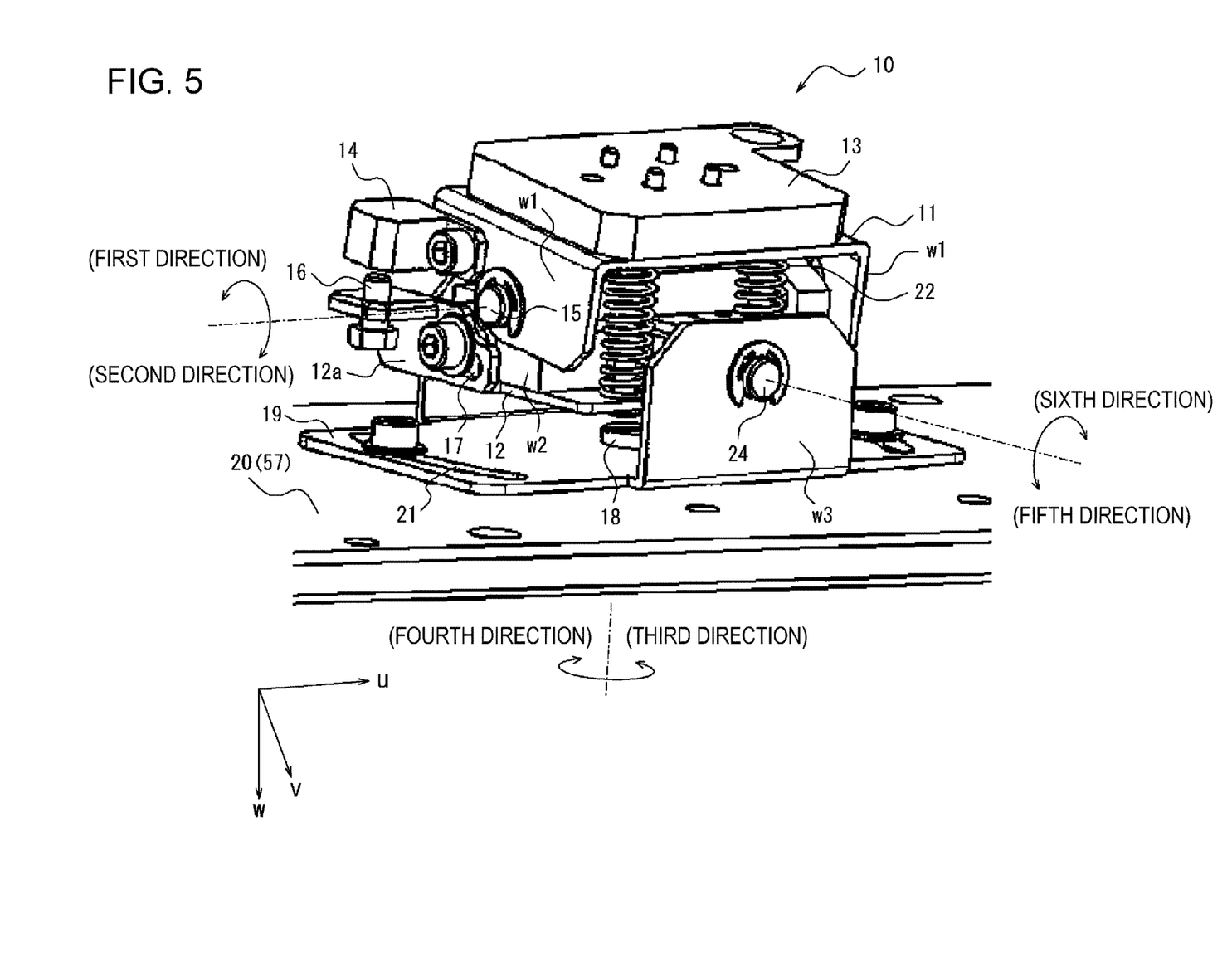
FIG. 5 is a perspective view of an exemplary appearance of an adjustment device according to an embodiment.
Figure 6:
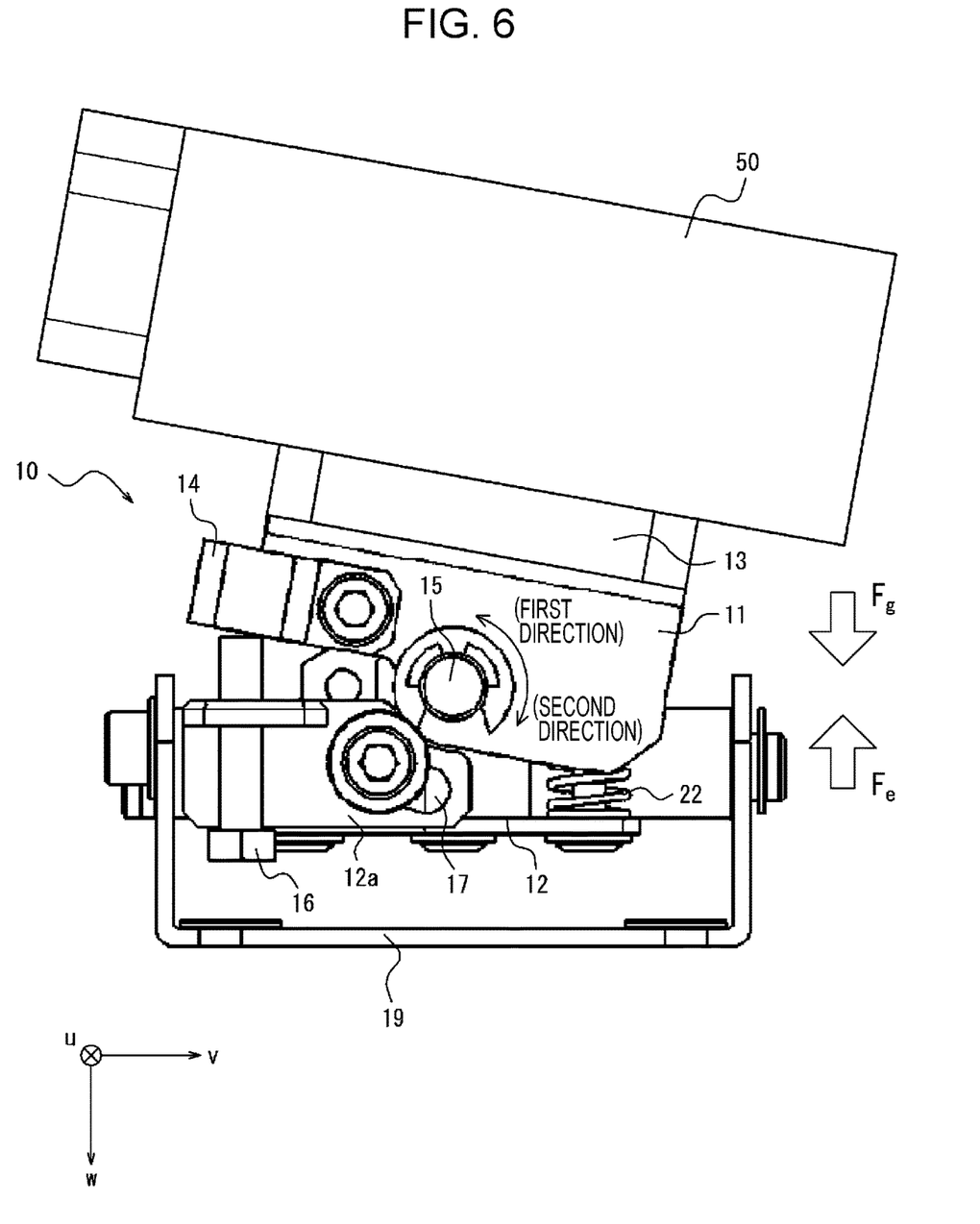
FIG. 6 is a side elevation view of the exemplary appearance of the adjustment device of FIG. 5.

FIG. 5 is a perspective view of an exemplary appearance of the adjustment device 10 according to the embodiment. FIG. 6 is a side elevation view of the exemplary appearance of the adjustment device 10 according to the embodiment. The adjustment device 10 includes a first member 11, a second member 12, an adjustment member 16, and elastic members 22. The first member 11 includes a base 13, on which the detector 50 is mountable. The first member 11 is attached to the second member 12 through a first shaft 15 such that the first member 11 is rotatable in a first direction and a second direction. The adjustment member 16 restricts rotation of the first member 11 in the first direction and defines a rotation range of the first member 11. The elastic members 22 urge the first member 11 in the first direction. The first and second directions are opposite rotation directions about the first shaft 15. The first member 11 may have a U-shape defined by, for example, two walls w1 extending from a bottom surface and facing each other. The second member 12 may have a U-shape defined by, for example, two walls w2 extending from a bottom surface and facing each other. The first member 11 and the second member 12 may be disposed such that the bottom surfaces of the members face each other in a direction in which the walls w1 and w2 extend. The first member 11 and the second member 12 may be combined such that the two walls w2 included in the second member 12 are located between the two walls w1 included in the first member 11. The first shaft 15 may be disposed through shaft holes located in the respective walls of the first member 11 and the second member 12. Although the elastic member 22 is a "spring" in the embodiment, the elastic member 22 may be a member other than a spring, for example, rubber, a leaf spring, or a hydraulic cylinder. A protruding member may be used instead of the elastic member 22. The amount of protrusion of the protruding member from the second member 12 may be adjusted to press the first member 11 in the first direction.

The first member 11 includes a contact portion 14 to contact the adjustment member 16. The contact portion 14 may be attached to one of the walls w1 of the first member 11. The adjustment member 16 extends from the second member 12 toward the contact portion 14 to contact the contact portion 14. Although the adjustment member 16 is a screw in the embodiment, the adjustment member 16 may be a member other than a screw. In the embodiment, adjusting the amount of protrusion of the screw, serving as the adjustment member 16 of the adjustment device 10, from a screw hole provided in the second member 12 adjusts the rotation range of the first member 11 in the first direction.

When the detector 50 is mounted on the base 13, as illustrated in FIG. 6, the weight of the detector 50 applies a force $F_g$ acting in a positive w-axis direction to the first member 11 such that the first member 11 may rotate in the second direction. In contrast, in the adjustment device 10 according to the embodiment, an elastic force $F_e$ of the elastic member 22 acting in a negative w-axis direction is applied to the first member 11 such that the first member 11 may rotate in the first direction. Thus, the first member 11 is stabilized such that an angle of the detector 50 mounted on the base 13 about the first shaft 15 is maintained at a position where the contact portion 14 contacts the adjustment member 16. Such a mechanism of the adjustment device 10 can reduce fluctuations in mounting angle of the detector 50. In the embodiment, the positive w-axis direction is a vertically downward direction (refer to FIG. 4), and the negative w-axis direction is a vertically upward direction (refer to FIG. 4).

Figure 9:
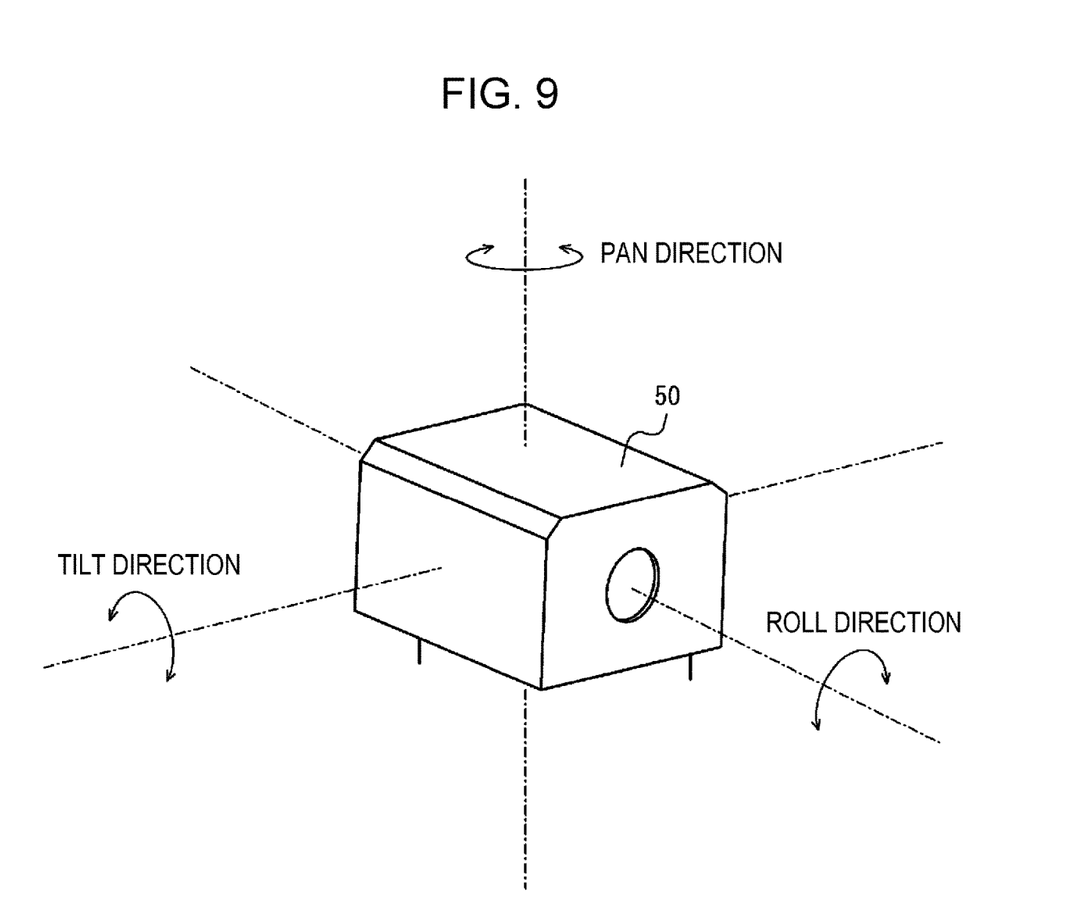
FIG. 9 is a diagram explaining adjustment directions of a detector.

As described above, in the adjustment device 10, the angle of the detector 50 mounted on the base 13 about the first shaft 15 can be adjusted by adjusting the amount of protrusion of the adjustment member 16 (screw) from the screw hole, and the angle can be maintained. For example, when the detector 50 is mounted on the base 13 such that the detection direction is aligned with the v-axis direction, a mounting angle of the detector 50 in a tilt direction is adjusted by using the adjustment member 16. For example, when the detector 50 is mounted on the base 13 such that the detection direction is aligned with the u-axis direction, a mounting angle of the detector 50 in a roll direction is adjusted by using the adjustment member 16. The v-axis direction and the u-axis direction in this case are the same as those in FIG. 3. The tilt direction is a direction of up-down movement of the detector 50 (refer to FIG. 9). The roll direction is a direction of side-to-side movement of the detector 50 (refer to FIG. 9). A pan direction, which will be described later, is a rotation direction of the detector 50 (refer to FIG. 9).

The adjustment device 10 is connected to the second member 12. The adjustment device 10 includes a third member 19 including arc-shaped second through-holes 21, as illustrated in FIG. 5. The third member 19 is attached to a mounting object 20 through the second through-holes 21 such that the second member 12 is rotatable about a second shaft 18 in a third direction and a fourth direction. The third member 19 may have a U-shape defined by, for example, two walls w3 extending from a base surface and facing each other. The second member 12 is attached to the third member 19 through a shaft 24 extending through through-holes located in the walls w3. The second member 12 is rotatable about the shaft 24 in a fifth direction and a sixth direction. The second member 12 at a predetermined rotational position is secured to the third member 19 by a screw (not illustrated). The third and fourth directions are opposite rotation directions about the second shaft 18. The second through-holes 21 are provided as parts of a circle centered on the second shaft 18. In the embodiment, the third member 19 is attached to the mounting object 20 by fasteners each including a shank extending through the second through-hole 21 and a hole located in the mounting object 20. Loosening the fasteners, or screws, can adjust a rotation angle of the second member 12 about the second shaft 18. In other words, a mounting angle of the detector 50 in the pan direction can be adjusted. In the embodiment, the mounting object 20 is the connector 57. In another example, the third member 19 may be attached directly to part of the pole 59. In other words, the mounting object 20 may be the pole 59.

The amount of protrusion of the adjustment member 16, which is the screw, is determined by the length of a shank of the screw. For example, if the shank has a limited length, the adjustment member 16 can be useful as long as the range of adjustment is increased to enable finer adjustment. A position of contact to the contact portion 14 changes depending on the amount of protrusion of the adjustment member 16. This leads to an increase in size of the contact portion 14. In the embodiment, the adjustment device 10 includes the contact portion 14, which can be turned relative to the first member 11, and the adjustment member 16. Such a configuration can provide fine adjustment beyond the range of adjustment based on the length of the adjustment member 16 and prevent an increase in size of the contact portion 14.

Figure 7:
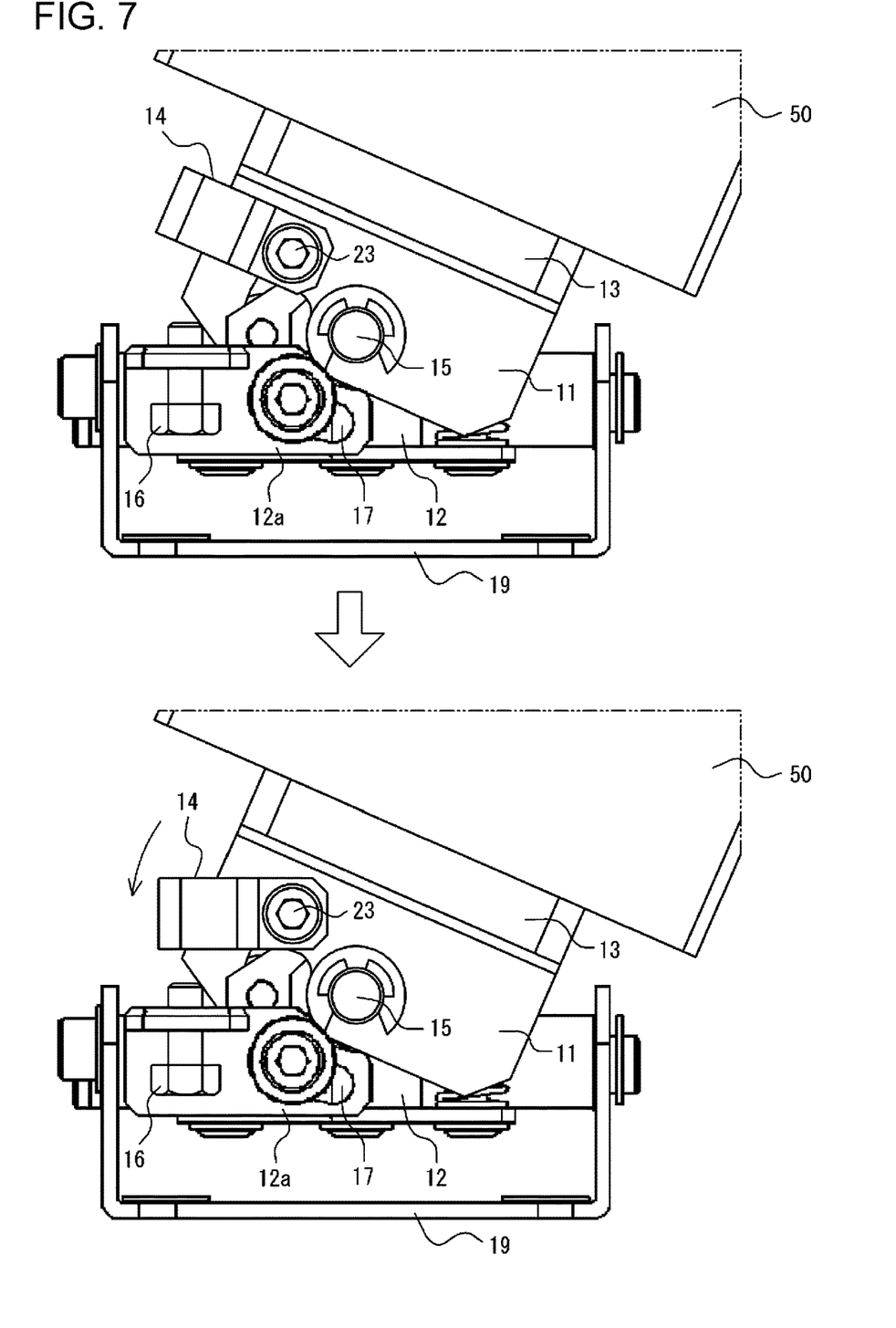
FIG. 7 is a diagram explaining a turn of a contact portion relative to a first member.

FIG. 7 is a diagram explaining a turn of the contact portion 14 relative to the first member 11. The contact portion 14 is turned relative to the first member 11 to adjust a distance to the adjustment member 16. In the embodiment, the contact portion 14 is secured at one end to the first member 11 by a screw, serving as a third shaft 23. Loosening the screw allows the contact portion 14 to pivot about the third shaft 23. In the example of FIG. 7, the position of the contact portion 14 is adjusted close to the adjustment member 16. This adjustment allows the contact portion 14 to be disposed at a position included in the range of protrusion of the adjustment member 16. Such a mechanism increases the range of adjustment, thus enabling finer adjustment of the mounting angle of the detector 50. Furthermore, a contact position where the adjustment member 16 contacts the contact portion 14 can be set to a predetermined position or within a predetermined range, regardless of the amount of protrusion of the adjustment member 16.

Figure 8:
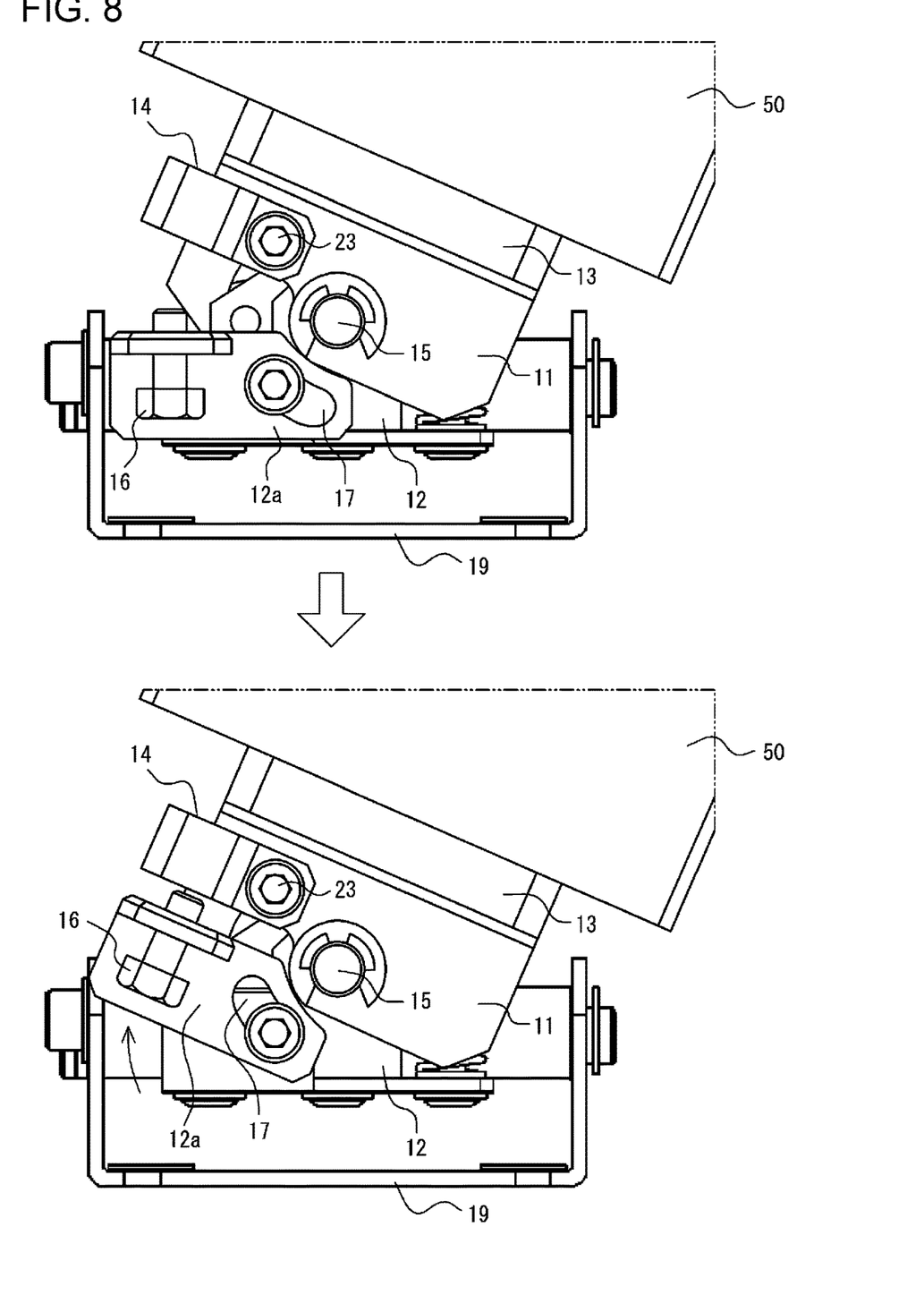
FIG. 8 is a diagram explaining a turn of an adjustment member relative to a second member.

FIG. 8 is a diagram explaining a turn of the adjustment member 16 relative to the second member 12. The adjustment member 16 is turned relative to the second member 12 to adjust a distance to the contact portion 14. The adjustment member 16 is movable along an arc-shaped path relative to the second member 12. Specifically, the adjustment member 16 is attached to a movable portion 12a of the second member 12 including an arc-shaped first through-hole 17. The movable portion 12a may be attached to one of the walls w2 of the second member 12. The adjustment member 16 may be attached through a screw hole to a flat member protruding from the movable portion 12a and facing the contact portion 14. The movable portion 12a is attached to a stationary portion of the second member 12 (or the second member 12 excluding the movable portion 12a) through the first through-hole 17. The movable portion 12a is movable with the adjustment member 16 along the arc-shaped path. The first through-hole 17 may be located in a part of the movable portion 12a remote from the attachment position of the adjustment member 16. In the embodiment, the movable portion 12a is secured to the stationary portion by a screw including a shank extending through the first through-hole 17 and a hole located in the stationary portion of the second member 12. Loosening this screw allows the angle of pivot of the movable portion 12a about the screw to be adjusted relative to the second member 12. In addition, loosening the screw allows the position of the movable portion 12a attached to the second member 12 to be adjusted within a range permitted by the arc-shaped first through-hole 17. In the example of FIG. 8, the position of the movable portion 12a is adjusted relative to the second member 12 such that the adjustment member 16 is closer to the contact portion 14. Furthermore, the position of the movable portion 12a secured by the screw through the first through-hole 17 is adjusted such that the adjustment member 16 can contact the contact portion 14 at a predetermined position. Such adjustment enables the adjustment member 16 to contact the contact portion 14. Such a mechanism increases the range of adjustment, thus allowing finer adjustment of the mounting angle of the detector 50. In addition, this mechanism allows the contact portion 14 to have a size at or below a predetermined size. The path along which the adjustment member 16 is movable relative to the second member 12 is not limited to an arc-shaped path. The first through-hole 17 may have a linear shape. In this case, the movable portion 12a may be linearly movable with the adjustment member 16 along the first through-hole 17.

Turning the contact portion 14 relative to the first member 11 may be performed simultaneously with turning the adjustment member 16 relative to the second member 12. Simultaneously turning these components significantly increases the range of adjustment. The adjustment device 10 may be configured such that one of the contact portion 14 and the adjustment member 16 is turned.

As described above, in the embodiment, the above-described configuration of the adjustment device 10 can reduce fluctuations in mounting angle of the detector 50. In the embodiment, the adjustment device 10 includes the adjustment member 16, which is turned relative to the second member 12. This enables fine adjustment of the angle of the base 13 in a wide range. In the embodiment, the adjustment device 10 further includes the contact portion 14, which is turned relative to the first member 11. This enables finer adjustment of the angle of the base 13 and a further increase in the range of adjustment.

While the present disclosure has been described with reference to the drawings and embodiments, it should be noted that those skilled in the art can easily make a variety of variations and alterations based on the present disclosure. Therefore, it should be noted that these variations and alterations are included in the scope of the present disclosure.

For example, in the above-described embodiment, in the adjustment device 10, the angles of the detector 50 in the tilt and pan directions or the angles of the detector 50 in the roll and pan directions can be adjusted depending on a mounting direction in which the detector 50 is mounted on the base 13. The adjustment device 10 may include multiple adjustment mechanisms each including the adjustment member 16 and the elastic members 22 so that the angles in the tilt, roll, and pan directions can be adjusted irrespective of the mounting direction of the detector 50.

For example, the above-described adjustment mechanism for rotation of the first member 11 relative to the second member 12 in the foregoing embodiment can be provided for the second member 12 and the third member 19. In this case, the contact portion 14 is provided on the second member 12, and the movable portion 12a and the adjustment member 16 are provided on the third member 19. The adjustment member 16 defines a rotation range of the second member 12 in the fifth direction. The elastic members 22 are disposed between the second member 12 and the third member 19, and thus urge the second member 12 in the fifth direction.

Although the adjustment device 10 is used for the detector 50 of the road observation apparatus 5 in the foregoing embodiment, the use of the adjustment device 10 is not limited to this example. The adjustment device 10 has uses in many apparatuses that may suffer from fluctuations in mounting angle due to their weights as well as the detector 50.

REFERENCE SIGNS 1 communication system
3 crossing
4 traffic signal
5 road observation apparatus
6 vehicle
7 road
9 pedestrian
10 adjustment device
11 first member
12 second member
12a movable portion
13 base
14 contact portion
15 first shaft
16 adjustment member
17 first through-hole
18 second shaft
19 third member
20 mounting object
21 second through-hole
22 elastic member
23 third shaft
24 shaft
50 detector
51 communication unit
52 storage unit
53 controller
57 connector
59 pole
w1, w2, w3 wall

The invention claimed is:

1. An adjustment device comprising:
a first member comprising a base on which a detector is mountable;
a second member to which the first member is attached through a first shaft such that the first member is rotatable in a first direction and a second direction;
an adjustment member configured to restrict rotation of the first member in the first direction and define a rotation range of the first member; and
an elastic member urging the first member in the first direction, wherein the first member is formed in a U-shape with two opposing first walls rising from a bottom surface, and the second member is formed in a U-shape with two opposing second walls rising from a bottom surface, the first member and the second member are arranged such that their bottom surfaces face each other in the direction in which the first wall and the second wall rise, and the elastic member is arranged in a position that contacts the bottom surface of the first member.

2. The adjustment device according to claim 1, wherein the first member comprises a contact portion to contact the adjustment member, and
the adjustment member extends from the second member toward the contact portion to contact the contact portion.

3. The adjustment device according to claim 2, wherein the contact portion is turned relative to the first member to adjust a distance to the adjustment member.

4. The adjustment device according to claim 2, wherein the adjustment member is turned relative to the second member to adjust a distance to the contact portion.

5. The adjustment device according to claim 1, wherein the adjustment member is movable relative to the second member along a predetermined path.

6. The adjustment device according to claim 1, wherein the adjustment member is attached to a movable portion included in the second member and comprising an arc-shaped first through-hole, and
the movable portion is attached to a stationary portion included in the second member through the first through-hole and is movable with the adjustment member along an arc-shaped path.

7. The adjustment device according to claim 1, wherein the adjustment member comprises a screw, and the rotation range of the first member in the first direction is adjusted by adjusting an amount of protrusion of the screw from a screw hole located in the second member.

8. The adjustment device according to claim 1, further comprising:
   a third member connected to the second member and comprising an arc-shaped second through-hole, the third member being attachable through the second through-hole to a mounting object such that the second member is rotatable about a second shaft in a third direction and a fourth direction that are different from the first direction and the second direction.

9. The adjustment device according to claim 8, wherein the second member is attached to the third member through a shaft such that the second member is rotatable in a fifth direction and a sixth direction that are different from the first direction, the second direction, the third direction, and the fourth direction.

10. The adjustment device according to claim 9, wherein
   the first direction and the second direction define a tilt direction of the detector,
   the third direction and the fourth direction define a pan direction of the detector, and
   the fifth direction and the sixth direction define a roll direction of the detector.

\* \* \* \* \*